United States Patent [19]

Hosokawa

[11] Patent Number: 5,242,239

[45] Date of Patent: Sep. 7, 1993

[54] METAL CONNECTOR FOR BUILDING AND JOINTING STRUCTURE OF BUILDING USING THE SAME

[76] Inventor: Kiyoshi Hosokawa, 779, Sasagase-cho, Hamamatsu-shi, Shizuoka-ken, Japan

[21] Appl. No.: 815,141

[22] Filed: Dec. 31, 1991

[30] Foreign Application Priority Data

Mar. 11, 1991 [JP] Japan ............... 3-039254[U]

[51] Int. Cl.⁵ .............................................. B23G 3/00
[52] U.S. Cl. .................................. 403/258; 403/260; 403/407.1; 52/721
[58] Field of Search ............ 403/232.1, 256, 258, 403/260, 246, 245, 231, 407.1; 52/721, 702, 703, 252

[56] References Cited

U.S. PATENT DOCUMENTS

| | | | |
|---|---|---|---|
| 1,335,554 | 3/1920 | Callahan | 403/231 X |
| 1,657,243 | 1/1928 | Daniels | 403/190 |
| 1,775,572 | 9/1930 | Ross | 403/174 |
| 3,064,321 | 11/1962 | Rose | 403/231 |
| 4,040,694 | 8/1977 | Lascarrou | 403/408.1 X |
| 4,558,968 | 12/1985 | Meickl | 403/174 |
| 4,616,950 | 10/1986 | Morris | 403/232.1 X |
| 4,981,388 | 1/1991 | Becken et al. | 403/258 |
| 5,061,111 | 10/1991 | Hosokawa . | |

FOREIGN PATENT DOCUMENTS

| | | |
|---|---|---|
| 658283 | 3/1938 | Fed. Rep. of Germany . |
| 3401303 | 7/1985 | Fed. Rep. of Germany . |
| 1423034 | 11/1964 | France . |
| 2-35142 | 2/1990 | Japan . |
| 2-157338 | 6/1990 | Japan . |
| 291911 | 3/1964 | Netherlands . |
| 422652 | 1/1968 | Switzerland . |

Primary Examiner—Randolph A. Reese
Assistant Examiner—George D. Spisich
Attorney, Agent, or Firm—Sughrue, Mion, Zinn, Macpeak & Seas

[57] ABSTRACT

A jointing structure for connecting a horizontal first member with a vertical second member via a metal connector body by a simple operation requiring little or no horizontal movement of the first member, and wherein the two members are connected with a quantitatively determinable and sufficient fastening strength. The metal connector body includes a bottom plate and a vertically attached core plate, the core plate having a threaded hole formed at an end face thereof, an opposite end face of the metal connector body being provided with a mounting plate which is secured to the second member. A fitting recess is formed in the first member, as is a working window hole disposed outwardly of the fitting recess. A bolt insertion hole is formed in the first member between the fitting recess and the working window hole, and the bolt insertion hole corresponds to the threaded hole in the core plate, a bolt being inserted into the bolt insertion hole and moved away from the fitting recess towards the working window hole so that the first member can be moved downwardly against a surface of the second member and so that the bottom plate and the core plate of the metal connector body are received in the fitting recess, without requiring a longitudinal movement of the horizontal member. The bolt is then moved toward the metal connector body and secured into the threaded hole in the core plate, and a nut is secured to the opposite end of the bolt at the working window hole to tighten the first member against the second member.

21 Claims, 14 Drawing Sheets

FIG.14
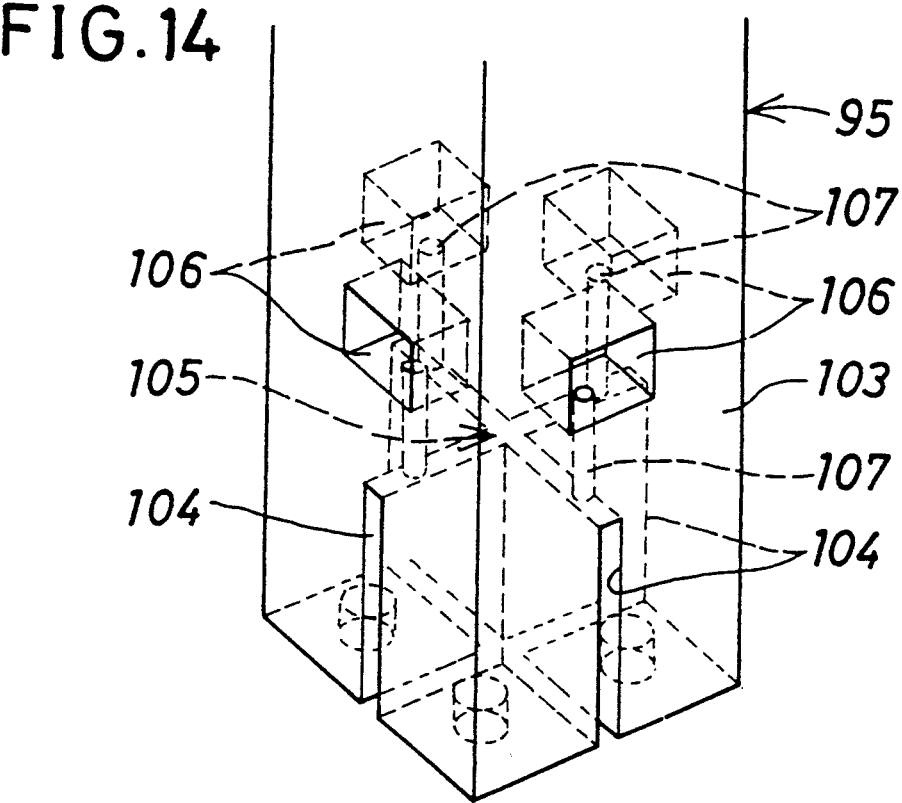
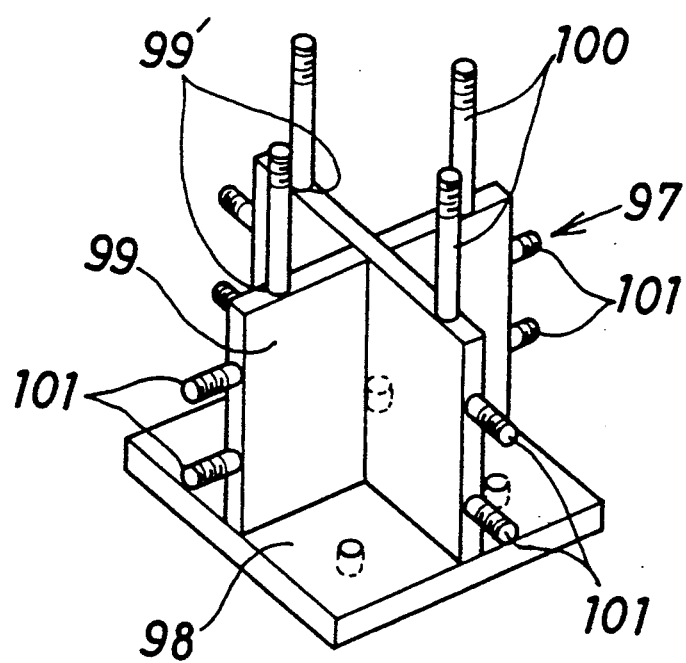

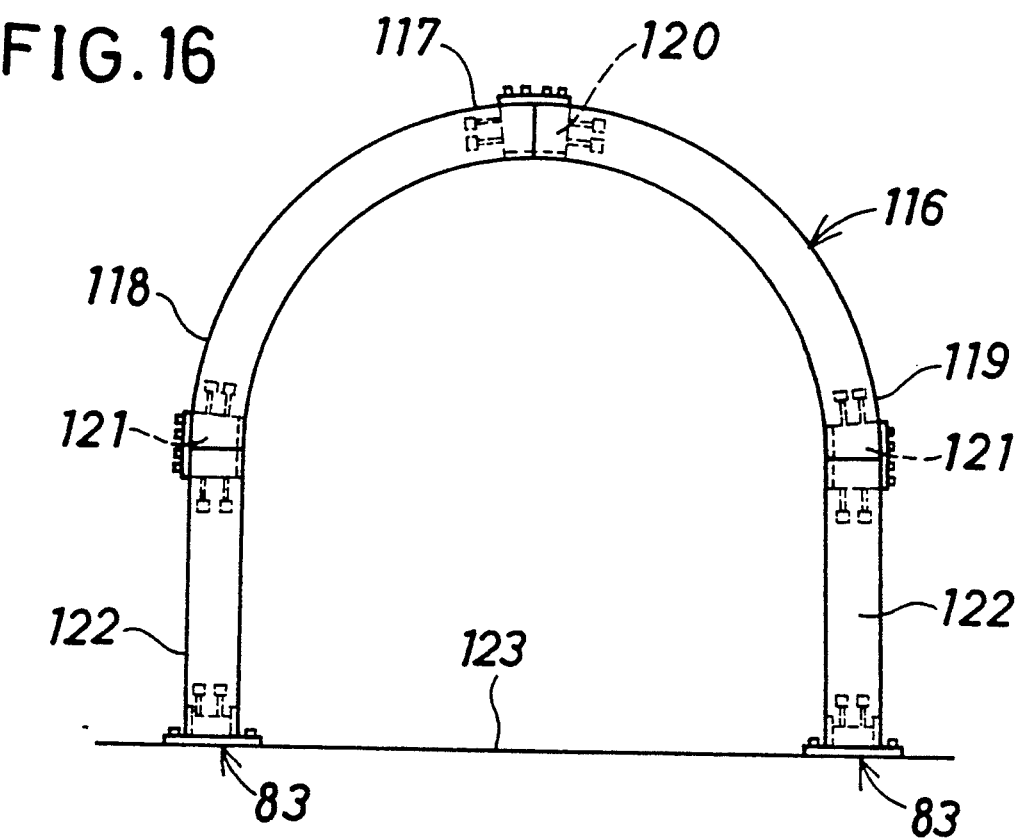
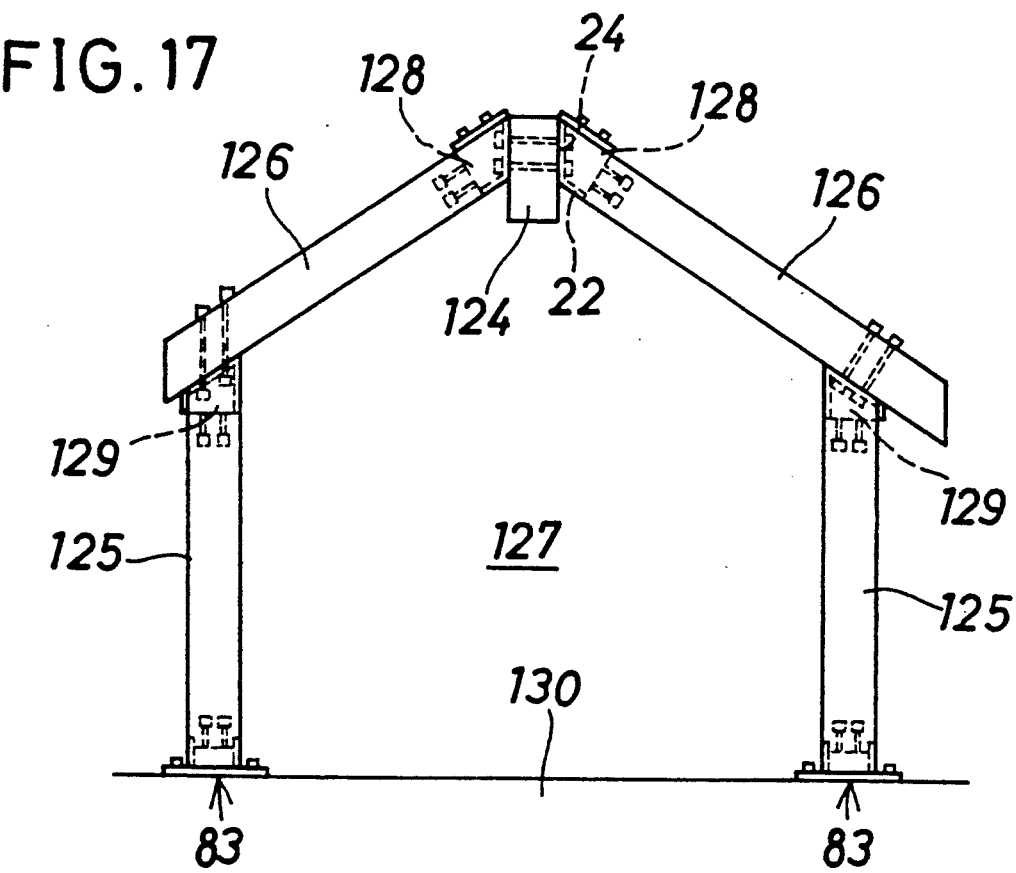

METAL CONNECTOR FOR BUILDING AND JOINTING STRUCTURE OF BUILDING USING THE SAME

BACKGROUND OF THE INVENTION

1. Field of the Invention

This invention relates improvements in or relating to a metal connector for building and also to a jointing structure of a building using such a metal connector.

2. Description of the Prior Art

A wooden building normally includes a large number of jointing structures at which two lumber blocks or wooden members are jointed to each other. Such jointing structures may be a jointing structure between a column and a beam, a jointing structure between a pair of beams extending in a serial direction or in perpendicular directions, a jointing structure between a column and a sill, a jointing structure at a principal rafter, that is, at the tops of a pair of left and right diagonal members forming a triangle of a truss together with a beam, a jointing structure between an outer end portion of a diagonal member and a top end of a column, or the like.

Various means are conventionally employed to connect two lumber blocks to each other in those jointing structures, including notches, holes and so forth formed on lumber blocks, metal connectors such as nails, bolts and nuts, dowels and flange plates, and bonding agents, or any combination of those means. Such various conventional connecting means have been developed and are adopted to joint general lumber members, that is, solid members to each other, and it is admitted that they exhibit anticipated effects as such.

The conventional connecting means, however, are not always satisfactory for a jointing structure in a large scale wooden building which draws much attention and which is built recently, and wherein structural assemblies are employed for main structural parts, because the connecting means are not sufficiently strong or because a metal connector is exposed to an outer side and, thus, presents a bad appearance.

Taking the above into consideration, the inventor has developed and proposed, in U.S. Pat. No. 5,061,111, a novel metal connector for a wooden building by which jointing structures of all types (not only in a wooden building which employs general lumber, but also in a large scale wooden building which employs structural assemblies) are provided with a satisfactory fastening strength without deteriorating the appearance as well as a novel jointing structure which makes use of such metal connectors.

The metal connector and the jointing structure disclosed in U.S. Pat. No. 5,061,111 are shown in FIGS. 18 and 19. Referring to FIGS. 18 and 19, the jointing structure shown is applied to connect a column and a beam to each other using the metal connector shown. The metal connector includes a metal connector body 1 which includes a rectangular bottom plate 2, a rectangular core plate 3 secured uprightly to an upper face of the bottom plate 2 along a center line, a mounting plate 4 secured uprightly to a longitudinal end of the bottom plate 2 and held in contact with and secured to an end face of the core plate 3, and a pair of wedge guide elements 5 and 6 mounted at symmetrical locations on the opposite faces of the core plate 3 adjacent the other longitudinal end remote from the mounting plate 4.

The metal connector is used to joint a column 7 and a beam 11 to each other. The column 7 has a recess 8 formed at a side face thereof at which it is to be jointed to the beam 11. The mounting plate 4 of the metal connector body 1 is fitted in the recess 8 of the column 7 and fastened to the column 7 by means of bolts 9 and nuts 10 to thereby rigidly secure the metal connector body 1 horizontally to the column 7.

The beam 11 has formed at an end portion thereof a fitting recess 12 which has a substantially same profile as an outer profile of the metal connector body 1 except the mounting plate 4.

Thus, in assembling the beam 11 to the column 7, the beam 11 is operated so that the metal connector body 1 secured to the column 7 may be fitted into the fitting recess 12 of the beam 11 so that the beam 11 may be supported on the bottom plate 2 of the metal connector body 1.

Then, in this condition, the beam 11 is moved horizontally toward the column 7 so that a pair of wedge receiving recesses 13 and 14 may be opened forwardly of the wedge guide elements 5 and 6 received in a pair of widened portions of the fitting recess 12 of the beam 11, that is, on the side adjacent the column 7.

Then, a pair of wedge members 15 and 16 are driven into the thus open wedge receiving recesses 13 and 14, respectively, whereupon the entire beam 11 is gradually moved toward the column 7 by a wedging action of the wedge members 15 and 16. Finally, an end face of the beam 11 is contacted closely with the opposing side face of the column 7, thereby establishing a required secured condition between the column 7 and the beam 11.

The above described conventional jointing structure has two significant disadvantages, as described in detail below.

In particular, when the beam 11 is to be fitted once with the metal connector body 1 secured to the column 7, such fitting operation is preformed at a position at which the end face 17 of the beam 11 is spaced sufficiently from the side face of the column 7, and then the beam 11 is moved axially to the column 7 to open the wedge receiving recesses 13 and 14, whereafter the wedge members 15 and 16 are driven into the wedge receiving recesses 13 and 14, respectively, to force the beam 11 to move further toward the column 7 until it is contacted closely with the column 7.

However, since the working spacing normally decreases as construction proceeds at a building site, it gradually becomes difficult to assure a room in which the beam 11 to be jointed to the column 7 is moved laterally from a position spaced by a required distance of even several centimeters to the column 7. In particular, in order to joint a beam to two columns such that it extends horizontally between the two columns, such a situation may take place that the two columns which have been installed in a prescribed condition must be deflected to open outwardly away from each other.

The jointing structure is also disadvantageous in the following respect. In particular, a necessary and sufficient fastening strength between a column and a beam in such jointing structure as described above is derived from a suitable degree (or depth) of driving of wedge members, and such fastening strength must not be insufficient nor excessive. However, it is a problem in this jointing structure that the fastening strength is difficult to determine quantitatively, i.e., it depends on the experience and skill of the person performing the connection.

SUMMARY OF THE INVENTION

It is an object of the present invention to provide a metal connector and a jointing structure with which a beam can be fitted with a metal connector body on a column almost only by an operation of placing the beam from above onto the metal connector body, so that spacing otherwise required for horizontal movement of such beam is minimized.

It is another object of the present invention to provide a metal connector and a jointing structure with which two members are jointed to each other with a sufficient fastening strength which can be quantitatively determined.

In order to attain these objects, according to one aspect of the present invention, there is provided a metal connector for jointing first and second members of a building to each other, which comprises a metal connector body including a bottom plate and a core plate secured vertically to an upper face of the bottom plate and having a threaded hole formed at an end face thereof, a bolt screwed at a base end portion thereof in the threaded hole of the core plate, the metal connector body being connected, at an end thereof remote from the bolt, to the second member, the first member having a fitting recess formed at a jointing end portion thereof in a profile suitable to closely receive the bottom plate and core plate of the metal connector body therein, the first member further having a working window hole formed at the jointing end portion thereof, the first member further having a bolt insertion hole formed therein to extend between the fitting recess and the working window hole, the bolt extending from the core plate of the metal connector body through the bolt insertion hole, when the metal connector body is received in the fitting recess of the first member, into the working window hole, and a nut screwed at the end portion of the bolt in the working window hole such that, when the nut is turned to move on the bolt toward the metal connector body, the nut forces the first member to move toward the second member until a longitudinal end of the first member is closely contacted with the second member.

The metal connector is thus simple in construction in that it comprises the metal connector body, a bolt and a nut. Accordingly, it can be produced readily, and a jointing operation with the metal connector can be performed readily by placing the jointing end portion of the first member from above in position onto the metal connector body mounted on the second member and then turning the nut on the bolt to force the first member to move to the second member. Further, with the metal connector, the jointing strength between the first and second members can be quantitatively determined. Consequently, the jointing strength can be adjusted suitably by adjusting the turning motion of the nut, and management and so forth of a building can be performed reasonably.

According to another aspect of the present invention, there is provided a metal connector for jointing first and second members of a building to each other, which comprises a metal connector body including a bottom plate and a core plate secured vertically to an upper face of the bottom plate and having a threaded hole formed at each of the opposite end faces thereof, a bolt screwed at a base end portion thereof in each of the threaded holes of the core plate, each of the first and second members having a fitting recess formed at a jointing end portion thereof in a profile suitable to closely receive corresponding longitudinal halves of the bottom plate and core plate of the metal connector body therein, each of the first and second members further having a working window hole formed at the jointing end portion thereof, each of the first and second members further having a bolt insertion hole formed therein to extend between the fitting recess and the working window hole, each of the bolts extending from the core plate of the metal connector body through the corresponding bolt insertion hole, when the metal connector body is received in the fitting recesses of the first and second members, into the corresponding working window hole, and a pair of nuts screwed at the end portions of the bolts in the working window holes such that, when the nuts are turned in a predetermined direction to axially move on the bolts toward the metal connector body, the nuts force the first and second members to move toward each other until opposing longitudinal ends thereof are closely contacted with each other.

The metal connector is thus simple in construction in that it comprises the metal connector body, a bolt and a nut. Accordingly, it can be produced readily, and a jointing operation with the metal connector can be performed readily by placing the jointing end portions of the first and second members from above in position onto the metal connector body and then turning the nuts on the bolts to force the first and second members to move toward each other. Further, with the metal connector, the first and second members are jointed in an end-to-end serial relationship to each other by turning the nuts in the predetermined direction, and the jointing strength between the first and second members can be graped quantitatively determined. Consequently, the jointing strength can be adjusted suitably by adjusting the turning motion of the nuts, and management and so forth of a building can be performed reasonably.

According to a further aspect of the present invention, there is provided a jointing structure for a building, which comprises a metal connector body including a bottom plate and a core plate secured vertically to an upper face of the bottom plate and having a threaded hole formed at an end face thereof, first and second members to be jointed to each other by means of the metal connector body, a bolt screwed at a base end portion thereof in the threaded hole of the core plate, means for connecting an end of the metal connector body remote from the bolt to the second member, the first member having a fitting recess formed at a jointing end portion thereof in a profile suitable to closely receive the bottom plate and core plate of the metal connector body therein, the first member further having a working window hole formed at the jointing end portion thereof, the first member further having a bolt insertion hole formed therein to extend between the fitting recess and the working window hole, the bolt extending from the core plate of the metal connector body through the bolt insertion hole, when the metal connector body is received in the fitting recess of the first member, into the working window hole, and a nut screwed at the end portion of the bolt in the working window hole such that, when the nut is turned to move on the bolt toward the metal connector body, the nut forces the first member to move toward the second member until a longitudinal end of the first member is closely contacted with the second member.

With the jointing structure, the first and second members are jointed to each other by placing the jointing end portion of the first member from above in position onto the metal connector body mounted on the second member and then turning the nut on the bolt to force the first member to move to the second member, and the jointing strength between the first and second members can be grasped quantitatively. Consequently, the jointing strength can be adjusted suitably by adjusting the turning motion of the nut, and management and so forth of a building can be performed reasonably. Accordingly, with the jointing structure, even an operator who is not skilled in the art can operate to obtain a suitable fastening strength between different members not only in a wooden building which employs general lumber but also in a large scale wooden building which employs structural assemblies as well as in a building of steel structure.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 14 is a fragmentary perspective view of the jointing structure shown in FIG. 13;

FIG. 16 is a front elevational view showing a jointing structure in an arch-shaped building;

FIG. 17 is a front elevational view showing a jointing structure wherein a pair of left and right diagonal members are mounted between a central ridge member and left and right columns, respectively;

DESCRIPTION OF THE PREFERRED EMBODIMENTS

Figure 1:
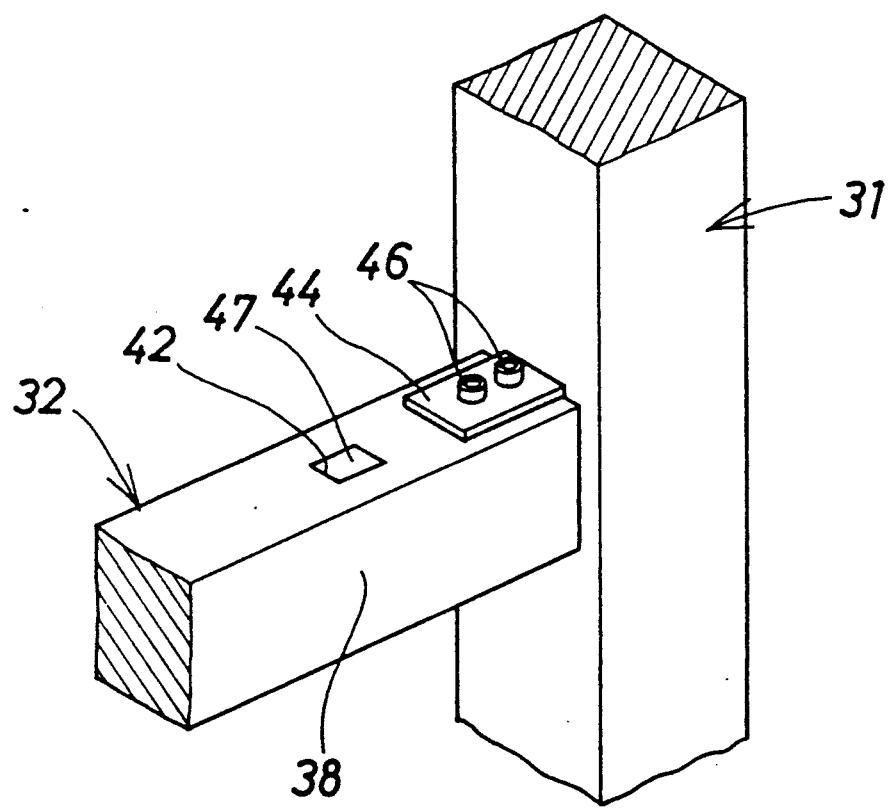
FIG. 1 is a perspective view of a metal connector and a jointing structure between a column and a beam using the metal connector showing a first preferred embodiment of the present invention.
Figure 2:
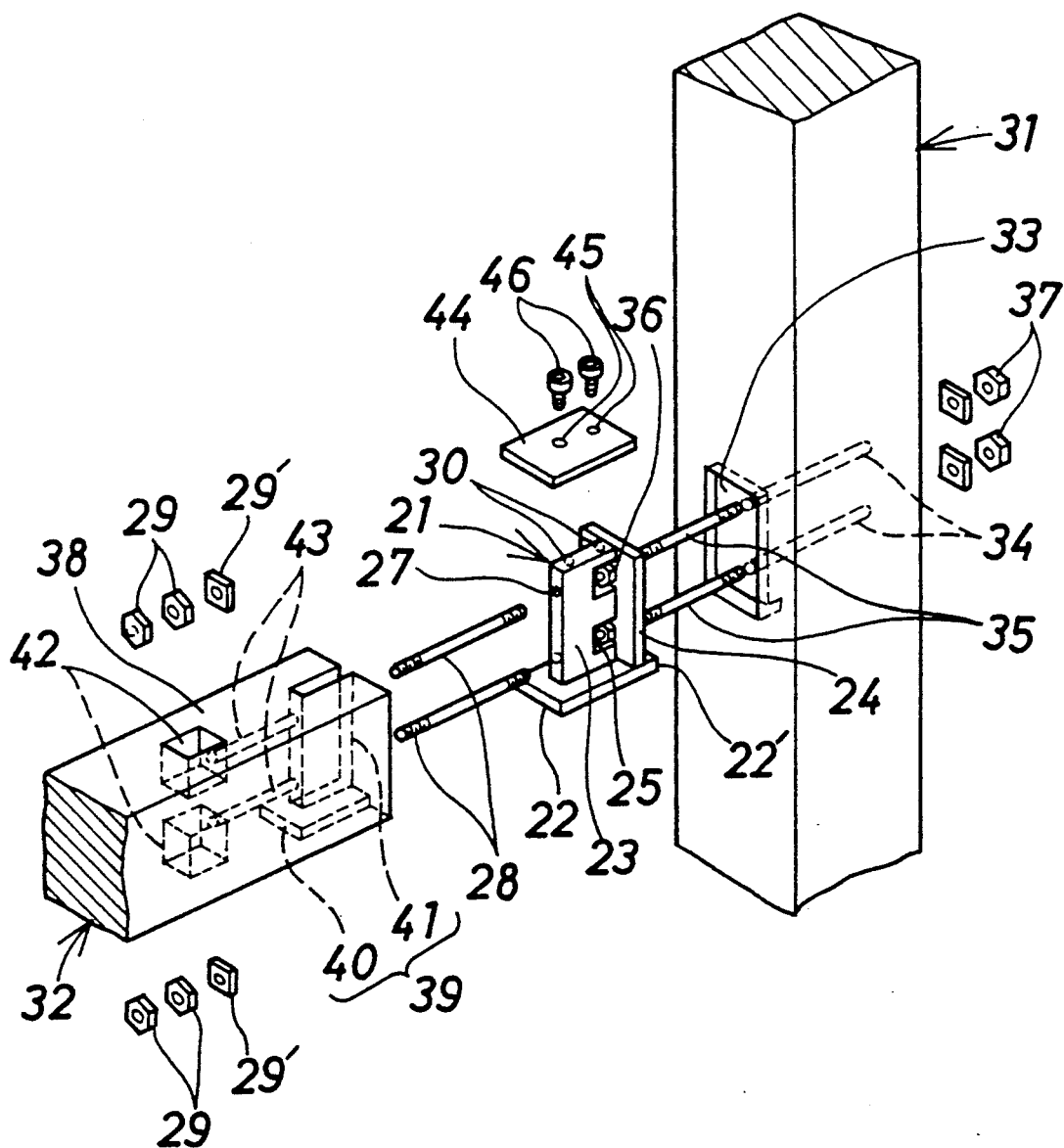
FIG. 2 is a fragmentary perspective view of the metal connector and jointing structure of FIG. 1.
Figure 3:
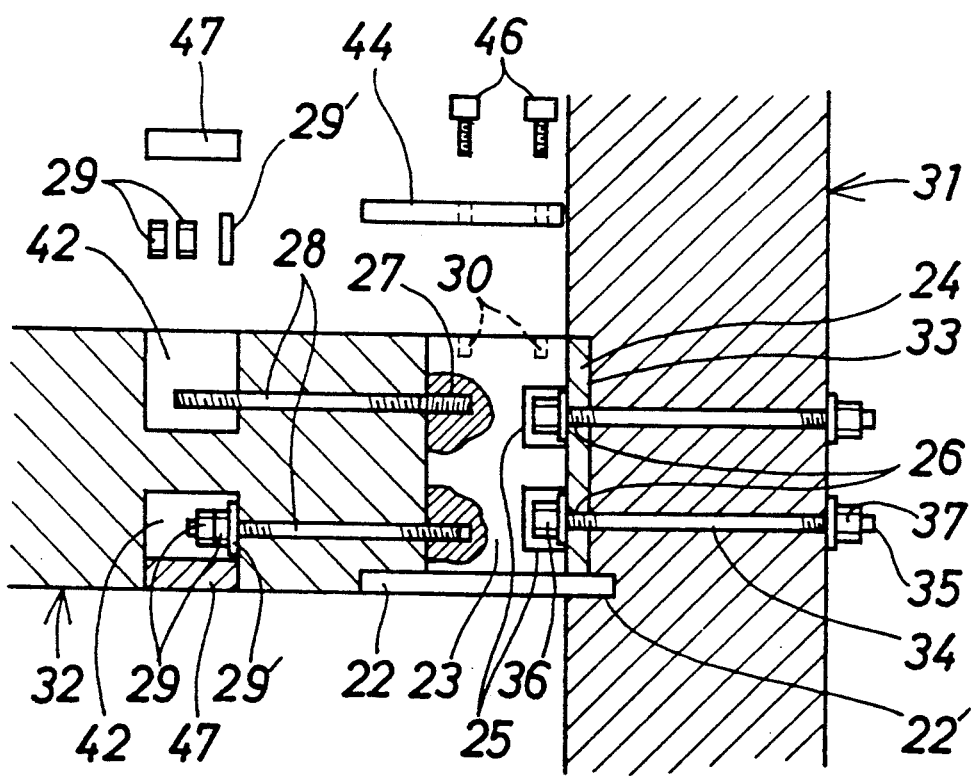
FIG. 3 is a sectional view showing the jointing structure of FIG. 1 at a stage in assembling.

Referring first to FIGS. 1 to 3, there are shown a metal connector and a jointing structure between a column and a beam using the metal connector according to a first preferred embodiment of the present invention. The metal connector shown includes a metal connector body 21 which includes a rectangular bottom plate 22, a rectangular core plate 23 secured uprightly to an upper face of the bottom plate 22 along a center line, and a mounting plate 24 placed securely and uprightly on an upper face of a longitudinal end portion of the bottom plate 22 and held in contact with and secured to an end face of the core plate 23. The bottom plate 22 extends, at a longitudinal outer end portion thereof, outwardly farther than the mounting plate 24 to form a lower flange 22'.

The mounting plate 24 has a width equal to the width of the bottom plate 22 and has a height equal to the height of the core plate 23.

The core plate 23 has a pair of rectangular window holes 25 perforated therein adjacent the mounting plate 24. The mounting plate 24 has a pair of bolt insertion holes 26 perforated therein in register with the window holes 25 of the core plate 23.

A pair of threaded holes 27 are formed at upper and lower locations on an end face of the core plate 23 remote from the window holes 25, and a pair of fastening bolts 28 are screwed at base end portions thereof in the threaded holes 27. A nut or nuts 29 are screwed at the other end portion of each of the fastening bolts 28 together with a washer 29'.

The core plate 23 has two threaded holes 30 formed in a predetermined spaced relationship on an upper end face thereof.

The metal connector body 21 can be produced readily either by individually preparing the bottom plate 22, core plate 23 and mounting plate 24 and assembling them by suitable means such as welding or fastening screws or by molding or casting them as a unitary member.

The metal connector is used to joint a column 31 and a beam 32 to each other.

The column 31 has a recess 33 formed at a side face thereof at which it is to be jointed to the beam 32. The recess 33 has a sufficient size to receive therein the mounting plate 24 and the lower flange 22' of the bottom plate 22 on which the mounting plate 24 is mounted.

The column 31 has two bolt insertion holes 34 perforated therein in an aligned relationship to the bolt insertion holes 26 of the mounting plate 24. The bolt insertion holes 34 extend from the bottom of the recess 33 to the opposite side face of the column 31.

The metal connector body 21 is attached to the column 31 in the following manner. In particular, inner end portions of a pair of fastening bolts 35 are individually inserted into the bolt insertion holes 26 of the mounting plate 24 of the metal connector body 21, and then a pair of nuts 36 are individually fitted with and screwed onto the inner end portions of the fastening bolts 35 in the window holes 25 of the core plate 23. Then, the fastening bolts 35 are inserted into the bolt insertion holes 34 of the column 31 until the mounting plate 24 and the lower flange 22' of the bottom plate 22 of the metal connector body 21 are received into the recess 33 of the column 31 and the other end threaded portions of the fastening bolts 35 are projected from the other side face of the column 31. Then, a pair of fastening nuts 37 are screwed onto and tightened to the thus projected end threaded portions of the fastening bolts 35 to rigidly secure the metal connector body 21 horizontally to the column 31 as seen in FIG. 3.

The beam 32 is jointed at a jointing end portion 38 thereof to the column 31 by means of the metal connector body 21. In particular, referring to FIG. 2, the jointing end portion 38 of the beam 32 has a fitting recess 39 formed therein which has a substantially same profile as that of the metal connector body 21 except the mounting plate 24 and the lower flange 22' of the bottom plate 22. The fitting recess 39 is thus composed of a horizontal flattened groove 40 formed in the jointing end portion 38 of the beam 32 and having a suitable size and shape to receive the bottom plate 22 of the metal connector body 21 therein, and a vertical slot 41 formed along the center line in the jointing end portion 38 perpendicularly and contiguously to the horizontal groove 40 and having a suitable size and shape to receive the core plate 23 of the metal connector body 21 therein. The horizontal groove 40 is opened to the bottom face and an outer end face of the jointing end portion 38 of the beam 32 while the vertical slot 41 is opened to the top face, bottom face and outer end face of the jointing end portion 38.

A pair of upper and lower working window holes 42 are formed in the jointing end portion 38 of the beam 32. The working window holes 42 extend vertically, and the upper working window hole 42 is opened to the top face of the jointing end portion 38 of the beam 32 while the lower working window hole 42 is opened to the bottom face of the jointing end portion 38. A pair of bolt insertion holes 43 are formed in the jointing end portion 38 of the beam 32 to individually extend between the vertical slot 41 of the fitting recess 39 and the working window holes 42.

The beam 32 is jointed to the column 31 in the following manner.

First, the fastening bolts 28 are installed in position into the jointing end portion 38 of the beam 32. More particularly, the fastening bolts 28 are inserted into the bolt insertion holes 43 in the jointing end portion 38 of the beam 32 to a position in which base end portions thereof at least do not extend into the vertical groove 41 as seen from the upper fastening bolt 28 in FIG. 3.

Then, the jointing end portion 38 of the beam 32 is placed from above onto the metal connector body 21 mounted on the column 31 so that the metal connector body 21 is received into the fitting recess 39. In the thus placed position of the jointing end portion 38 of the beam 32, the bottom plate 22 of the metal connector body 21 is fitted in the flattened groove 40 of the jointing end portion 38 of the beam 32 while the core plate 23 is fitted in the vertical slot 41, and the top face of the beam 32, that is, the top face of the jointing end portion 38, and the top face of the metal connector body 21, or more particularly the top face of the core plate 23, are aligned with each other.

In this instance, an operation of fitting the beam 32 with the metal connector body 21 does not require moving the beam 32 laterally in a horizontal direction, or in other words, even at a location where a spacing necessary for such lateral movement cannot be assured, such fitting operation can be performed readily by moving the jointing end portion 38 of the beam 32 downwardly from above, which is an advantage of a metal connector and a jointing structure according to the present invention.

Subsequently, base end portions of the fastening bolts 28 are operated to turn the fastening bolts 28 to move into the threaded holes 27 of the mounting plate 24, and then the washers 29' and the nuts 29 are fitted onto the base end portions of the fastening bolts 28 and the nuts 29 are turned to be tightened. In this instance, the nuts 29 are used as a double nut or a dual nut in order to prevent possible loosening of the nuts 29.

As a result of such tightening of the nuts 29, an end face of the jointing end portion 38 of the beam 32 is closely contacted with the opposing side face of the column 31, thereby obtaining an intended jointing structure.

In this instance, a pressing or fastening strength between the column 31 and the beam 32 can apparently be grasped quantitatively from an amount of movement of the nuts 29 on the fastening bolts 28, that is, an amount of turning motion of the nuts 29, which is another advantage of a metal connector and a jointing structure according to the present invention.

Finally, a cover plate 44 is placed onto the top face of the jointing end portion 38 of the beam 32 jointed to the column 31 as seen in FIG. 1, and screws 46 are inserted into perforations 45 formed in the cover plate 44 and are screwed tightly into the threaded holes 30 at the top end of the core plate 23 as seen in FIG. 1. It is to be noted that a packing plate 47 made of a same material as the beam 32 may additionally be inserted into each of the working window holes 42 of the beam 32 to fill up the working window holes 42.

While the jointing structure described above with reference to FIGS. 1 to 3 employs only one such metal connector as described above and joints a single column and a single beam to each other, a column to beam jointing structure may otherwise joint two, three or four beams in different directions to a column. In any case, each beam can be jointed to a column using such metal connector as described above. However, attention must naturally be paid so that fastening bolts may not interfere with each other in the column.

Figure 4:
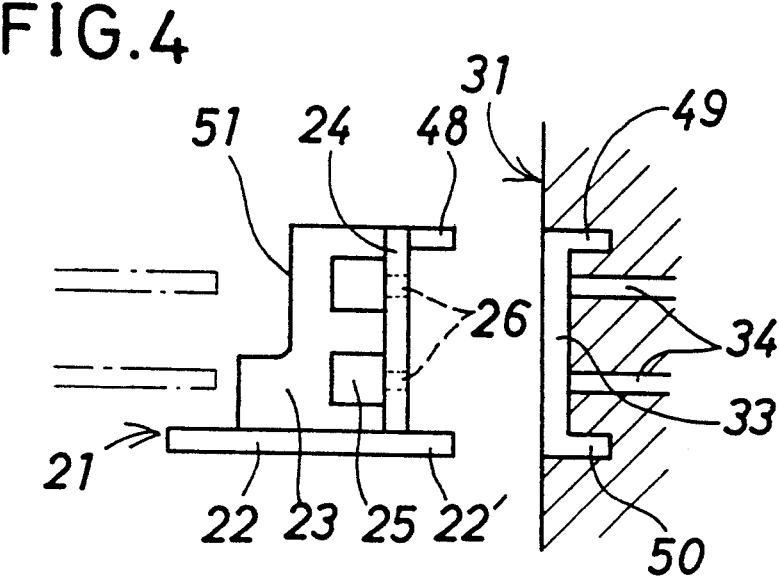
FIG. 4 is a side elevational sectional view showing a modification to a metal connector body of the metal connector shown in FIG. 1.
Figure 5:
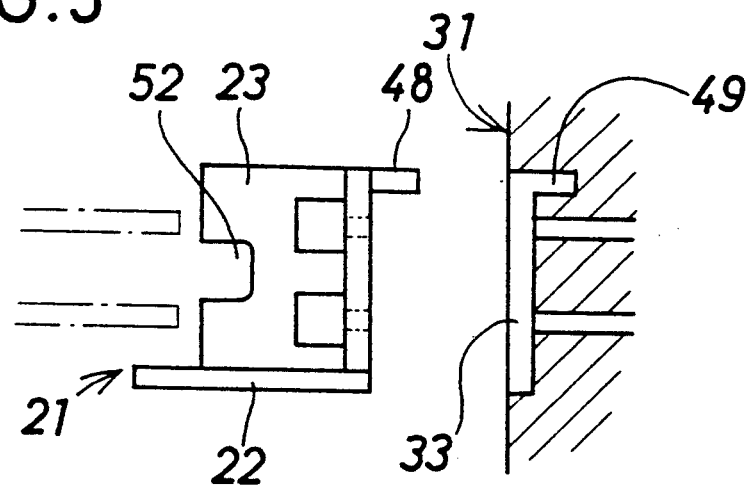
FIG. 5 is a similar view but showing another modification to the metal connector body shown in FIG. 1.
Figure 6:
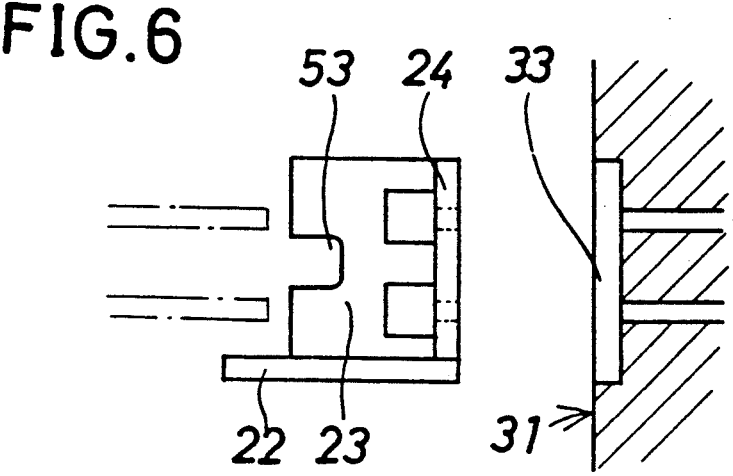
FIG. 6 is a similar view but showing a further modification to the metal connector body shown in FIG. 1.

FIGS. 4 to 6 show three different modifications to the metal connector body 21 shown in FIGS. 1 to 3.

The modified metal connector body shown in FIG. 4 is denoted also at 21 and constructed such that it has, in addition to the lower flange 22' which is an extension of the bottom plate 22, an upper flange 48 extending from the top end of an outer face of the mounting plate 24 in parallel to the lower flange 22'. Thus, a column 31 to which the modified metal connector body 21 is to be assembled has a pair of flange receiving grooves 49 and 50 formed at upper and lower ends of the recess 33 such that they may receive the upper and lower flanges 48 and 22' of the metal connector body 21, respectively.

It is to be noted that a cutaway portion 51 is provided at a corner of the mounting plate 24 to reduce the overall weight of the metal connector body 21.

Meanwhile, the modified metal connector body 21 shown in FIG. 5 is a modification also to the modified metal connector body 21 shown in FIG. 4 in that it has the upper flange 48 on the mounting plate 24 thereof but does not have the lower flange 22'. Thus, a column 31 for use with the present modified metal connector 21 may only have the upper flange receiving groove 49 at the top end of the recess 33. Further, a cutaway portion 52 is provided at a vertical midpoint along the mounting plate 24 to reduce the overall weight of the metal connector body 21.

On the other hand, the modified connector body 21 shown in FIG. 6 is constructed such that it does not have either of the upper and lower flanges 48 and 22'. Thus, a column 31 for use with the present modified metal connector 21 may have no flange receiving groove formed therein. Meanwhile, a cutaway portion 53 is provided at a vertically mid portion of the mounting plate 24 to reduce the overall weight of the metal connector body 21.

Figure 7:
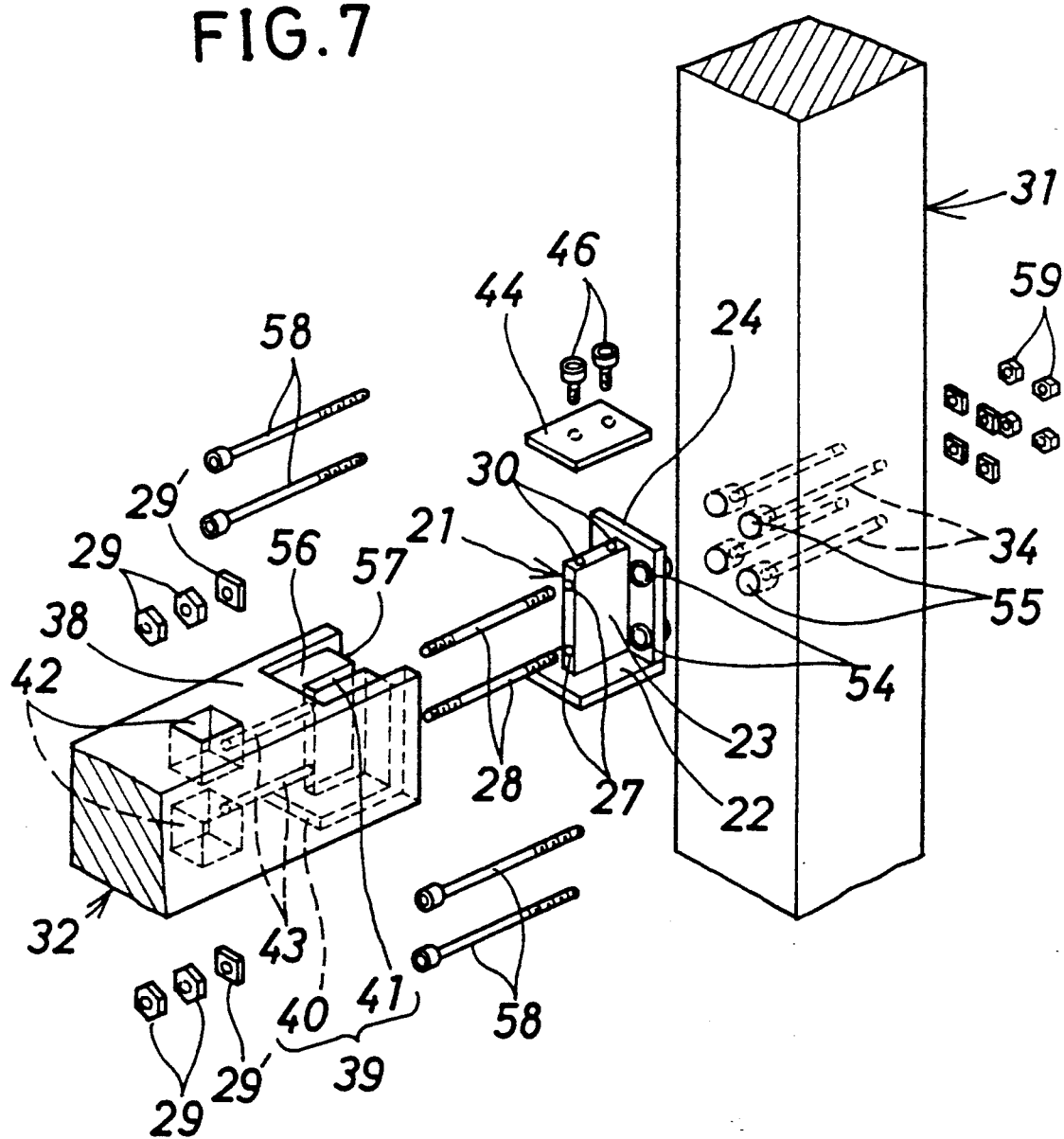
FIG. 7 is a fragmentary perspective view of a metal connector and a jointing structure between a column and a beam using the metal connector showing a second preferred embodiment of the present invention.
Figure 8:
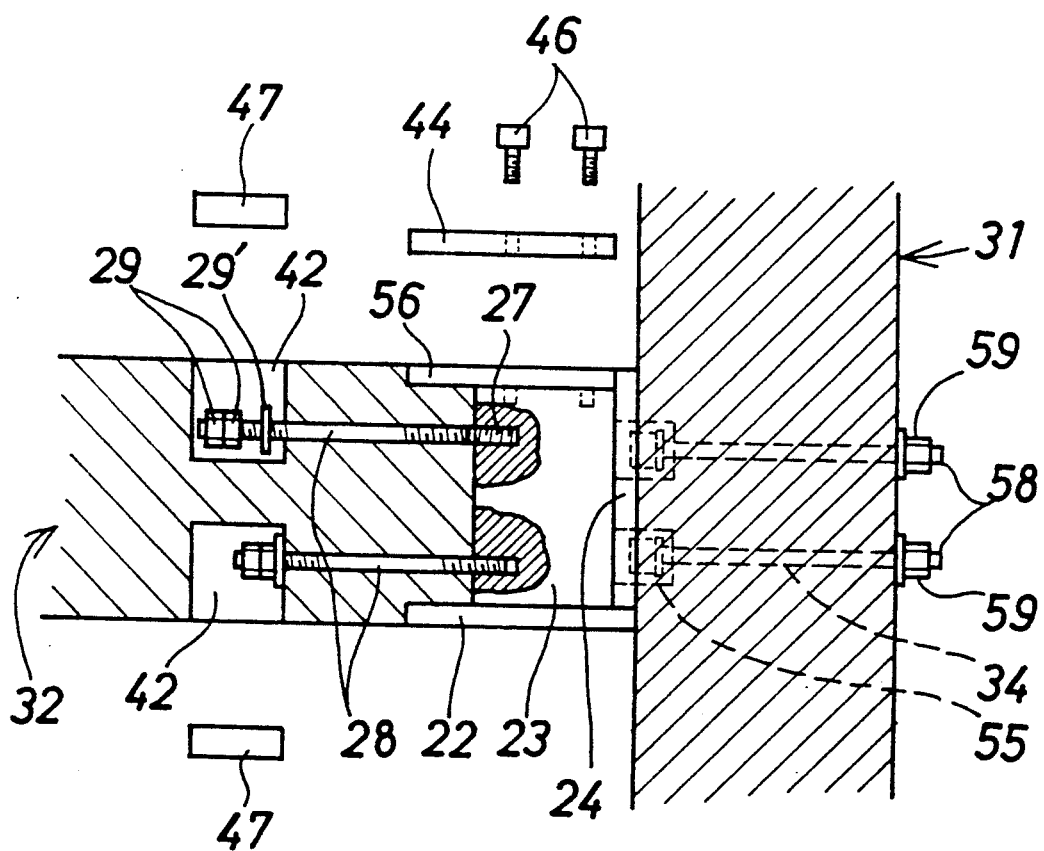
FIG. 8 is a sectional view showing the jointing structure of FIG. 7 at a stage in assembling.

Referring now to FIGS. 7 and 8, there are shown a metal connector and a jointing structure between a column and a beam using the metal connector according to a second preferred embodiment of the present invention. The metal connector and the jointing structure are a modification to the metal connector and the jointing structure shown in FIGS. 1 to 3, respectively, and since they have somewhat common construction, only differences of the former from the latter will be described below.

The mounting plate 24 of the connector metal body 21 has two pairs of bolt head receiving tubes or hubs 54 formed in a predetermined spaced relationship on and extending outwardly from an outer face thereof. Meanwhile, the core plate 23 has a height a little smaller than the height of the mounting plate 24.

Thus, a column 31 for use with the metal connector body 21 has two pairs of depressions 55 formed in a predetermined relationship on a side face thereof for receiving therein the bolt head receiving tubes 54 of the mounting plate 24 of the metal connector body 21. The depressions 55 are formed contiguously to and concentrically with the bolt insertion holes 34 formed in the column 31.

Meanwhile, a beam 32 for use with the metal connector body 21 has a shallow groove 56 formed on the top face of the jointing end portion 38 thereof for receiving the cover plate 44 therein. Further, the beam 32 has another shallow groove 57 formed on the outer longitudinal end of the jointing end portion 38 thereof for receiving the mounting plate 24 therein.

The metal connector body 21 in the present embodiment is assembled to the column 31 in the following manner. In particular, the metal connector body 21 is operated to insert the bolt head receiving tubes 54 on the mounting plate 24 thereof into the depressions 55 of the column 31 until the mounting plate 24 is contacted with the opposing side face of the column 21. Then, fastening bolts 58 are individually inserted into the bolt insertion holes 34 through round holes formed in the bolt head receiving tubes 54, and then nuts 59 are individually screwed tightly onto ends of the fastening bolts 58 which are projected outwardly from the opposite side face of the column 31, thereby to secure the metal connector body 21 to the column 32.

Then, the jointing end portion 38 of the beam 32 is fitted with the metal connector body 21 mounted on the column 31 in a similar manner as in the first embodiment described hereinabove. Consequently, the beam 32 is rigidly fastened to the column 31 by way of the metal connector body 21, thereby obtaining an intended jointing structure.

Finally, the cover plate 44 is fitted into and placed onto the bottom of the shallow groove 56 of the beam 32 and secured to the core plate 23 of the metal connector body 21 by means of the screws 46.

Figure 9:
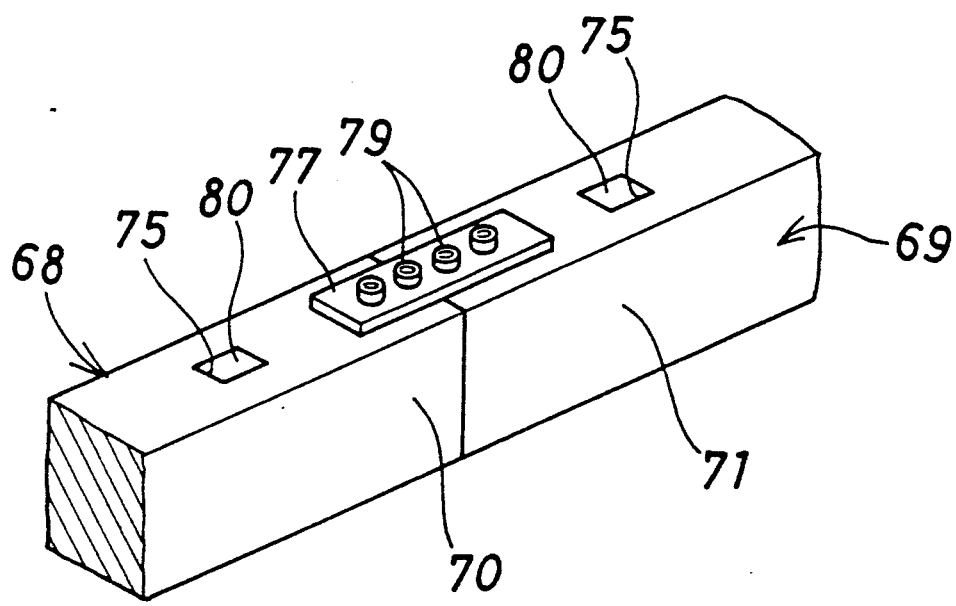
FIG. 9 is a perspective view of a metal connector and a jointing structure between a pair of beams in a series direction using the metal connector showing a third preferred embodiment of the present invention.
Figure 10:
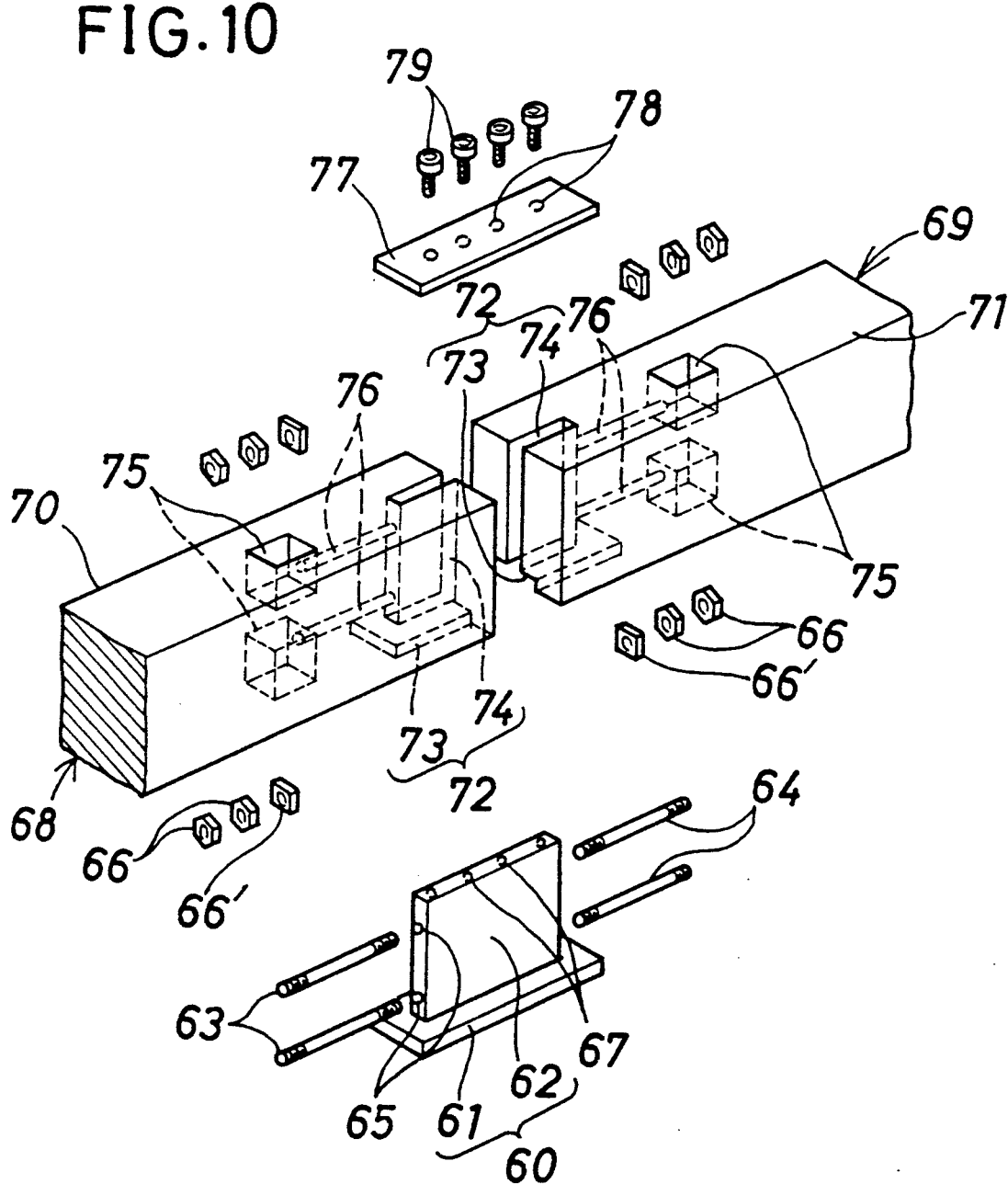
FIG. 10 is a fragmentary perspective view of the metal connector and the jointing structure shown in FIG. 9.

Referring now to FIGS. 9 and 10, there are shown a metal connector and a jointing structure between two beams in a serial direction using the metal connector according to a third preferred embodiment of the present invention. The metal connector of the present embodiment includes a metal connector body 60 which includes a rectangular bottom plate 61 and a rectangular core plate 62 secured uprightly to an upper face of the bottom plate 61 along a center line.

The core plate 62 has a pair of threaded holes 65 formed at upper and lower locations on each of the opposite longitudinal end faces thereof, and two pairs of bolts 63 and 64 are screwed at base end portions thereof in the threaded holes 65 of the core plate 62. A nut or nuts 66 are screwed at the other end portion of each of the fastening bolts 63 and 64 together with a washer 66'.

Four threaded holes 67 are formed in a predetermined spaced relationship at an upper end face of the core plate 62.

Similarly as in the case of the metal connector body 21 in the first embodiment described hereinabove, the metal connector body 60 can be produced readily either by individually preparing the bottom plate 61 and core plate 62 and assembling them by suitable means such as welding or fastening screws or by molding or casting them as a unitary member.

The metal connector is used to joint a pair of beams 68 and 69 to each other along a straight line. The beams 68 and 69 are jointed at jointing end portions 70 and 71 thereof to each other by means of the metal connector body 60. In particular, referring to FIG. 10, the jointing end portions 70 and 71 of the beams 68 and 69 have a pair of fitting recesses 72 formed therein which generally have a substantially same profile as that of the metal connector body 60. Each of the fitting recesses 72 is thus composed of a flattened horizontal groove 73 formed at the bottom of the jointing end portion 70 or 71 of the beam 68 or 69 and having a suitable size and shape to receive a longitudinal half of the bottom plate 61 of the metal connector body 60 therein, and a vertical slot 74 formed along the center line in the jointing end portion 70 or 71 and having a suitable size and shape to receive a longitudinal half of the core plate 62 therein. The horizontal groove 73 is opened to the bottom face and an outer end face of the jointing end portion 70 or 71 of the beam 68 or 69 while the vertical slot 74 is opened to the top face, bottom face and outer end face of the jointing end portion 70 or 71.

A pair of upper and lower working window holes 75 are formed in each of the jointing end portions 70 and 71 of the beams 68 and 69. The upper working window hole 75 is opened to the top face of the jointing end portion 70 or 71 while the lower working window hole 75 is opened to the bottom face of the jointing end portion 70 or 71.

Each of the jointing end portions 70 and 71 of the beams 68 and 69 has a pair of bolt insertion holes 76 formed therein such that they individually extend between the vertical slop 74 of the fitting recess 72 and the working window holes 75.

The beams 68 and 69 are jointed to each other in the following manner.

First, the fastening bolts 63 and 64 are installed in position into the jointing end portion 70 and 71 of the beams 68 and 69, respectively. More particularly, the fastening bolts 63 and 64 are inserted into the bolt insertion holes 76 in the jointing end portions 70 and 71 of the beams 68 and 69 to a position in which base end portions thereof at least do not extend into the vertical slots 74.

Then, the jointing end portions 70 and 71 of the beams 68 and 69 are placed from above onto the metal connector body 60 so that the metal connector body 60 is received into the fitting recesses 72 of the jointing end portions 70 and 71 while the jointing end portions 70 and 71 are placed onto the bottom plate 61 of the metal connector body 60.

Subsequently, base end portions of the fastening bolts 63 and 64 are operated to turn the fastening bolts 63 and 64 to move into the threaded holes 65 of the core plate 62, and then the washers 66' and the nuts 66 are fitted onto the base end portions of the fastening bolts 63 and 64 and the nuts 66 are turned to be tightened. In this instance, the nuts 66 are used as a double nut or a dual nut in order to prevent possible loosening of the nuts 66.

Finally, a cover plate 77 is placed onto the top faces of the jointing end portions 70 and 71 of the beams 68 and 69, and screws 79 are inserted into perforations 78 formed in the cover plate 77 and are screwed tightly into the threaded holes 67 at the top end of the core plate 62 as seen in FIG. 9. A packing plate 80 made of a same material as the beams 68 and 69 may additionally be inserted into each of the working window holes 75 of the beams 68 and 69 to fill up the working window holes 75.

Consequently, the two beams 68 and 69 are jointed to each other in a linear condition by means of the metal connector as seen in FIG. 10.

Figure 11:
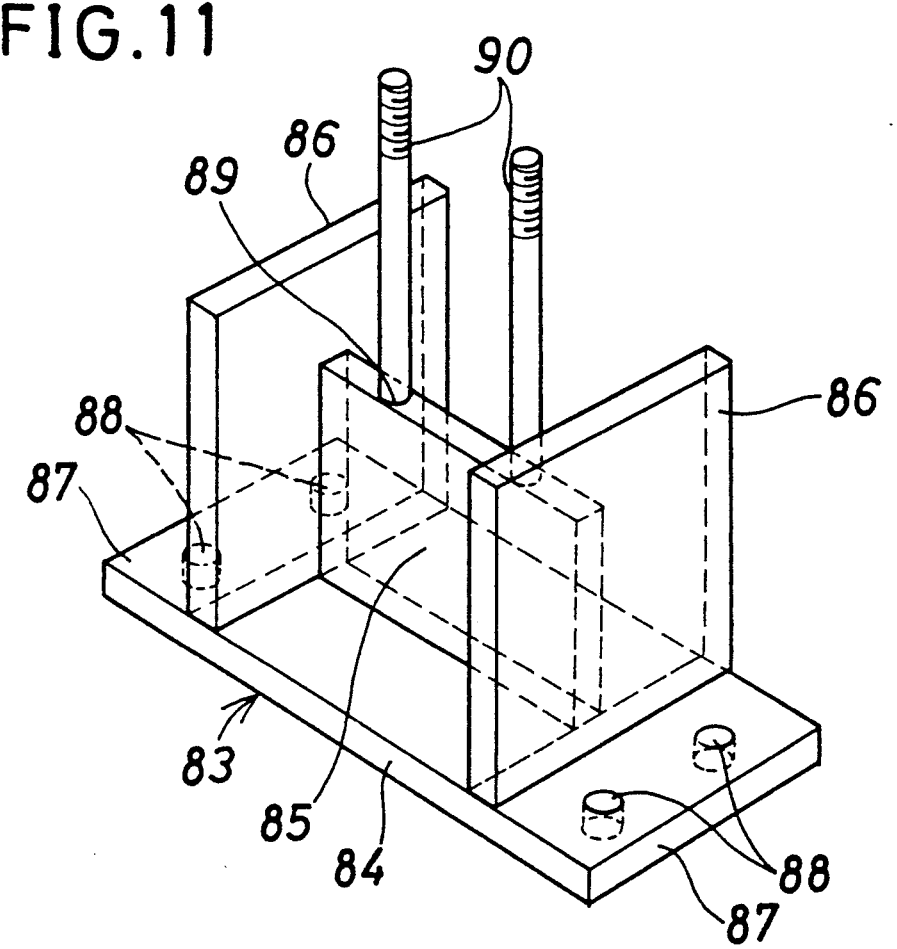
FIG. 11 is a perspective view of a metal connector showing a fourth preferred embodiment of the present invention.
Figure 12:
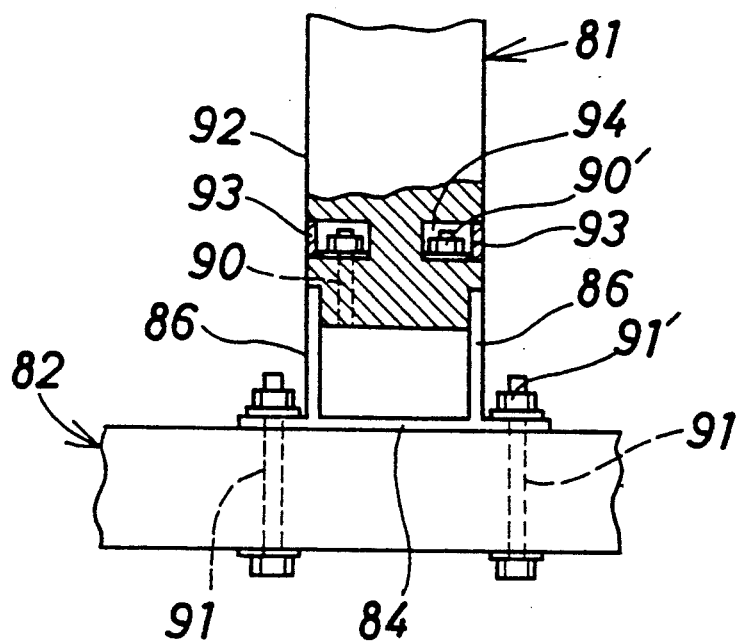
FIG. 12 is a side elevational view, partly in section, of a jointing structure between a column and a sill using the metal connector shown in FIG. 11.

Referring now to FIGS. 11 and 12, there are shown a metal connector and a jointing structure between a column and a sill using the metal connector according to a fourth preferred embodiment of the present invention. The metal connector shown includes a metal connector body 83 which includes a rectangular bottom plate 84, a core plate 85 mounted uprightly on an upper face of the bottom plate 84 along a center line, and a pair of mounting plates 86 mounted on the bottom plate 84 adjacent the opposite longitudinal ends of the core plate 85 and having a greater height than the core plate 85. The bottom plate 84 extends at the opposite longitudinal ends thereof outwardly farther than the mounting plates 86 to form a pair of lower flanges 87. A pair of bolt insertion holes 88 are performed in each of the lower flanges 87 of the bottom plate 84. A pair of threaded holes 89 are formed on the top face of the core plate 85, and a pair of fastening bolts 90 are screwed at bottom end portions thereof in the threaded holes 89 of the core plate 85.

The metal connector body 83 is secured, at the bottom plate 84 thereof, to an upper face of a sill 82 by means of a plurality of fastening bolts 91 and nuts 91'.

A column 81 to be jointed to the sill 82 by means of the metal connector has a fitting recess formed at a joining end portion 92, that is, a lower end portion thereof for receiving the metal connector body 83 in a similar manner as the fitting recess 39 of the beam 32 in the first embodiment described hereinabove. The metal connector body 83 is fitted in the fitting recess of the column 81, and a lower end face of the jointing end portion 92 of the column 81 is held in contact with the top face of the bottom plate 84 on the sill 82.

A packing plate 93 similar to the packing plate 47 in the first embodiment is filled in each of a pair of working window holes 94 formed in the jointing end portion 92 of the column 81. A nut 90' is screwed to an end portion of each of the fastening bolts 90 extending into the corresponding working window hole 94.

Figure 13:
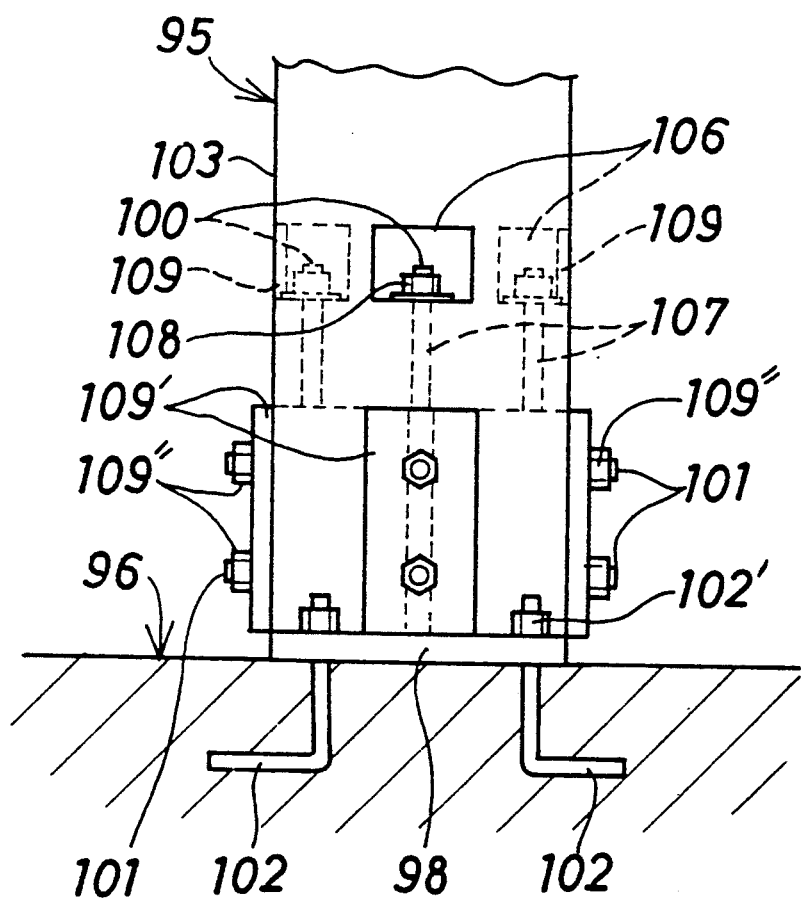
FIG. 13 is a side elevational view, partly in section, of a metal connector and a jointing structure between a column and a sill using the metal connector showing a fifth preferred embodiment of the present invention.

Referring now to FIGS. 13 and 14, there are shown a metal connector and a jointing structure between a column and a sill using the metal connector according to a fifth preferred embodiment of the present invention. The metal connector shown includes a metal connector body 97 which includes a square bottom plate 98, and a core plate 99 mounted uprightly on an upper face of the square bottom plate 99 and having a cross shape in plan. Four bolts 100 are screwed vertically at base end portions thereof in threaded holes 99' formed at the top face of the cross-shaped core plate 99 while a pair of fastening bolts 101 are screwed horizontally at base end portions thereof in threaded holes formed in each of four outer end faces of the cross-shaped core plate 99 as seen in FIG. 14.

The metal connector body 97 is secured, at the bottom plate 98 thereof, to an upper face of a sill 96 by means of four anchor bolts 102 and four nuts 102'.

A column 95 to be jointed to the sill 96 by means of the metal connector has a fitting recess 105 formed at a joining end portion 103, that is, a lower end portion thereof and composed of a pair of vertical slots 104 which are opened to the four side faces of the jointing end portion 103 and cross each other in such a manner as to provide the fitting recess 105 with a cross shape in plan which conforms to the cross shape of the core plate 99 of the metal connector body 97. The column 95 further has four working window holes 106 formed therein in a spaced relationship above the vertical slots 104, and four bolt insertion holes 107 are formed between the working window holes 106 and the vertical slots 104.

The column 95 is assembled to the sill 96 in the following manner by way of the metal connector body 97. In particular, the column 95 is operated so that the cross-shaped core plate 99 of the metal connector body 97 mounted on the sill 96 is fitted into the fitting recess 105 of the column 95 while upper end portions of the fastening bolts 100 on the core plate 99 are individually inserted into the bolt insertion holes 107 of the jointing end portion 103 of the column 95 until they are projected into the working window holes 106 of the column 95. Then, nuts 108 are screwed to and tightened on the end portions of the fastening bolts 100 projected into the working window holes 106 thereby to fasten the jointing end portion 103 of the column 95 to the sill 96 with the bottom plate 98 of the metal connector body 97 interposed therebetween.

A packing plate 109 similar to the packing plate 47 in the first embodiment may be filled in each of the working window holes 106. A cover plate 109' similar to the cover plate 44 in the first embodiment is secured to each of the four side faces of the jointing end portion 103 of the column 92 by screwing nuts 109" to end portions of the fastening bolts 101 projected from the four side faces of the column 95.

Figure 15:
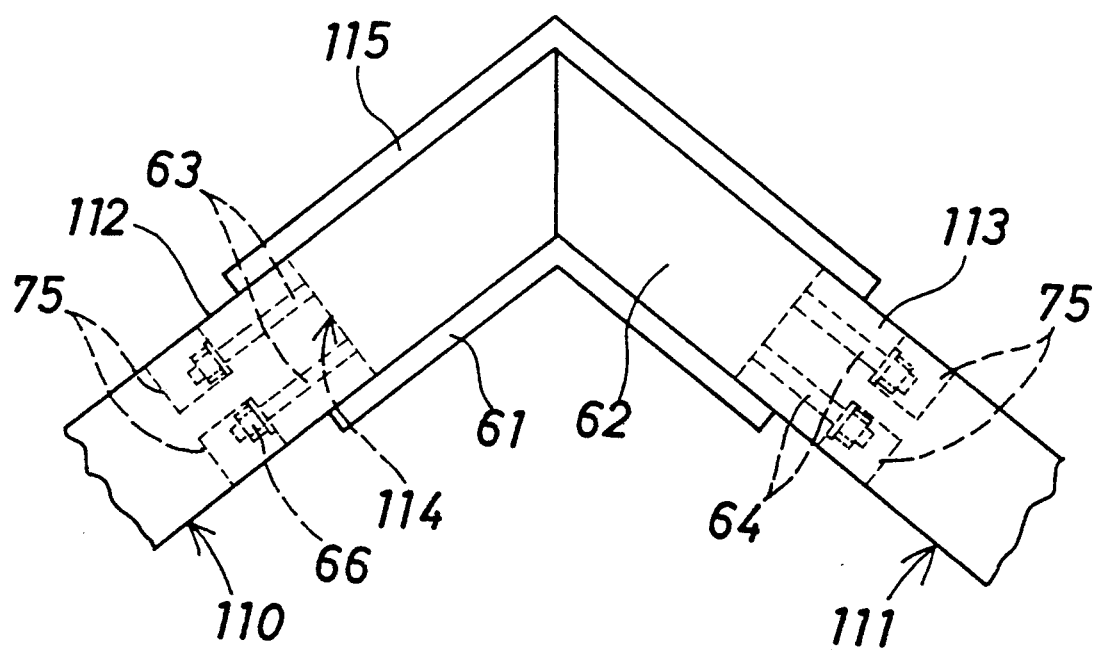
FIG. 15 is a front elevational view of a metal connector and a jointing structure between top ends of a diagonal members which form a principal rafter using the metal connector showing a sixth preferred embodiment of the present invention.
Figure 18:
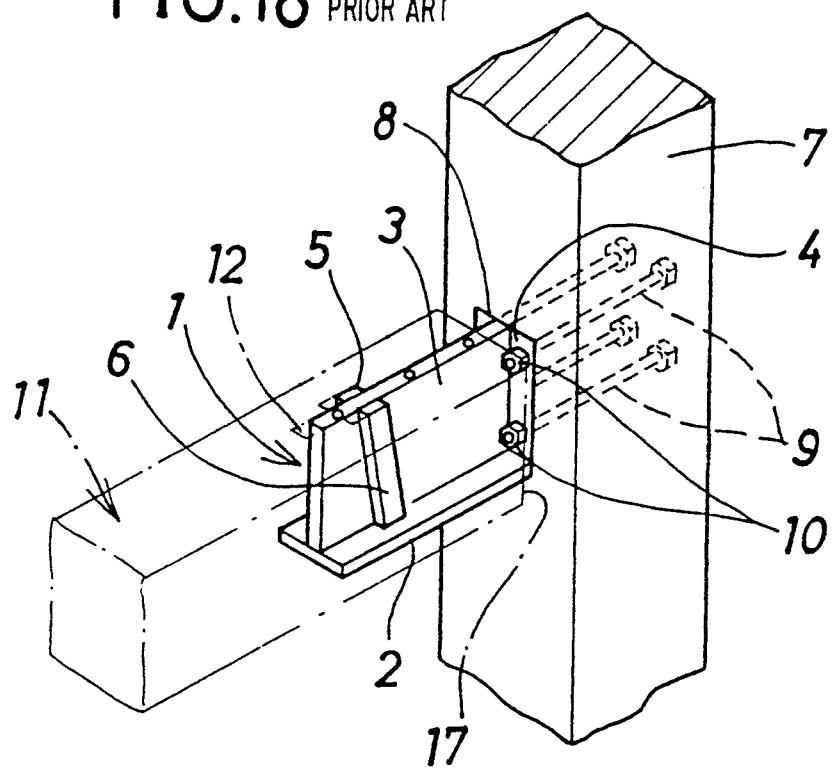
FIG. 18 is a perspective view showing a conventional metal connector and a conventional jointing structure between and a column and a beam using the metal connector.
Figure 19:
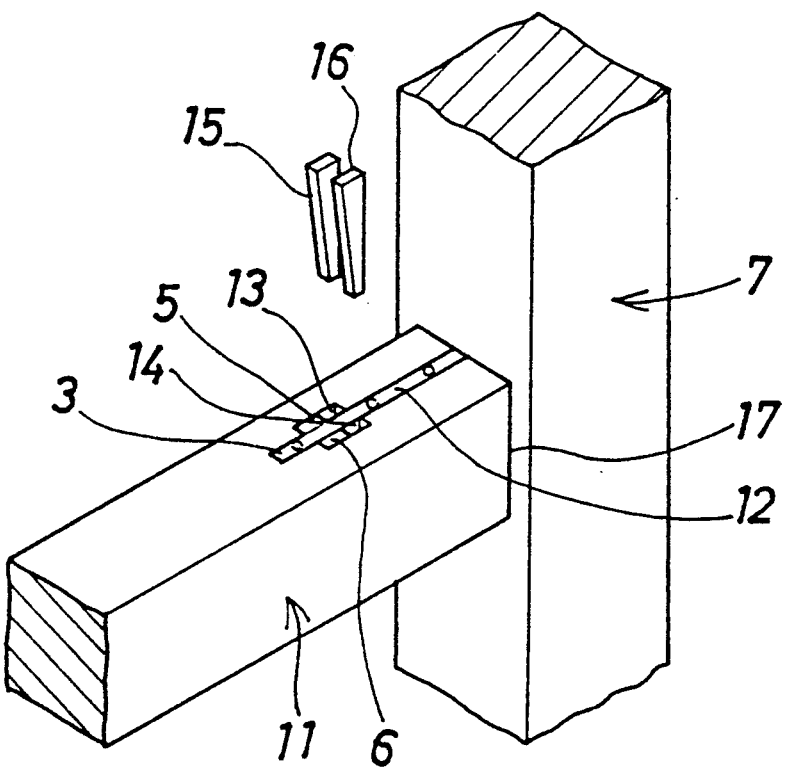
FIG. 19 is a perspective view of the metal connector and the jointing structure of FIG. 18 but at a stage immediately before the column and the beam are finally secured to each other by means of wedge members.

Referring now to FIG. 15, there are shown a metal connector and a jointing structure between a pair of diagonal members using the metal connector according to a sixth embodiment of the present invention. More particularly, the metal connector is used to joint top portions of a pair of left and right diagonal members 110 and 111 which form a principal rafter.

The jointing structure is similar in a sense to the jointing structure between a pair of the beams in a serial direction using the metal connector of the third embodiment shown in FIGS. 9 and 10. In particular, the jointing structure of the present embodiment is only different from the jointing structure in the third embodiment in that a bottom plate 61 and a core plate 62 of a metal connector body 114 of the metal connector of the present embodiment each having a comparatively great length are bent in an inverted V-shape at an angle at which the left and right diagonal members 110 and 111 are to be jointed to each other at jointing end portions 112 and 113 thereof. A cover plate 115 is also bent in an inverted V-shape at the same angle as the metal connector body 114.

Referring now to FIG. 16, there is shown a jointing structure in an arch-shaped building. The arch-shaped building 116 employs, at a curved jointing portion thereof, a modification to the metal connector body 60 in the third embodiment described above, and employs, at a jointing portion between a column thereof and a sill, the metal connector body 83 in the fourth embodiment described above.

In particular, a modified metal connector body 120 and a pair of modified metal connector bodies 121 are employed for a top portion 117 and a pair of left and right curved portions 118 and 119, respectively, of the arch-shaped building 116. The metal connector bodies 120 and 121 are modifications to the metal connector body 60 in the third embodiment in that the bottom plate 61 and core plate 62 are curved with a curvature conforming to the curvature of the corresponding portion of the arch-shaped building. Meanwhile, the metal connector body 83 in the fourth embodiment is employed to secure each of a pair of left and right columns 122 of the arch-shaped building 116 to a sill 123.

FIG. 17 shows a jointing structure in a building 127 wherein a pair of left and right diagonal members 126 extend between a central ridge member 124 and a pair of left and right columns 125.

Referring to FIG. 17, a metal connector body 128 which is a modification to the metal connector body 21 in the first embodiment that is different from the modifications shown in FIGS. 4 to 6 is employed for jointing between the ridge member 124 of the building 127 and a top portion of each of the left and right diagonal members 126, and another metal connector body 129 which is another different modification to the metal connector body 21 in the first embodiment is employed for jointing between a lower end portion of each of the left and right diagonal members 126 and a top portion of a corresponding one of the left and right columns 125.

While the mounting plate 24 of the metal connector body 21 in the first embodiment is mounted perpendicularly to the bottom plate 22, the metal connector body 128 is constructed such that the mounting plate 24 is mounted in an inclined relationship at an obtuse angle with respect to the bottom plate 22. On the other hand, the metal connector body 129 is constructed such that the mounting plate 24 is mounted in an inclined relationship at an acute angle with respect to the bottom plate 22. The metal connector bodies 128 and 129 are thus shaped so as to have angles conforming to angles made by the jointing portions of the building 127.

The metal connector body 83 is employed to secure each of the left and right columns 125 to a sill 130.

Having now fully described the invention, it will be apparent to one of ordinary skill in the art that many changes and modifications can be made thereto without departing from the spirit and scope of the invention as set forth herein.

What is claimed is:

1. A metal connector for connecting a first horizontal member to a second vertical member, comprising:

a metal connector body including a bottom plate and a core plate, said core plate being secured vertically to an upper face of said bottom plate to extend longitudinally along said bottom plate, said core plate having at least one threaded hole formed at an end face thereof adjacent to said first member;

means for connecting said metal connector body, at an end thereof remote from said at least one threaded hole, to said second member;

said first member being provided with a fitting recess formed at a connecting end portion thereof, said fitting recess defining a space suitable to closely receive therein at least a portion of said bottom plate and said core plate of said metal connector body, said fitting recess being open to a bottom of said first member;

said first member further being provided with a working window hole formed adjacent said connecting end portion and outwardly of said fitting recess;

said first member further being provided with a bolt insertion hole extending between said fitting recess and said working window hole for receiving a bolt for connecting said first member with said core plate, said bolt insertion hole and said working window hole being sized sufficiently such that said bolt can be inserted into said bolt insertion hole prior to connecting said first member and said core plate, said bolt being displaced horizontally within said bolt insertion hole away from said fitting recess toward said working window hole so that said first member can be moved vertically downward along said second member and said core plate can be received in said fitting recess without requiring a longitudinal movement of said first member, whereupon said bolt is connected at one end thereof with said threaded hole formed in said core plate; and a nut screwed at an opposite end portion portion of said bolt in said working window hole such that, when said nut is turned to move on said bolt toward said metal connector body said nut forces said first member to move toward said second member unit the connecting end portion of said first member is firmly and securely contacted with said second member.

2. A metal connector as claimed in claim 1, wherein said means for connecting said metal connector body to said second member comprises a mounting plate secured to a longitudinal end of said core plate adjacent to said second member, and suitable numbers of fastening bolts and nuts for securing said mounting plate and, therefore, said metal connector body to said second member.

3. A metal connector as claimed in claim 2, wherein said mounting plate has a flange formed to extend laterally from an upper portion or a lower portion, or each of upper and lower portions of an outer face thereof, said second member having a flange receiving recess or recesses formed therein for receiving the flange or flanges therein.

4. A metal connector as claimed in claim 2, wherein said mounting plate has a plurality of bolt head receiving tubes formed on an outer face thereof for receiving therein the heads of said fastening bolts.

5. A metal connector as claimed in claim 1, wherein said core plate is cross-shaped, and said second member is a sill, and further comprising suitable numbers of anchor bolts and nuts for securing said bottom plate of said metal connector body to said sill.

6. A metal connector as claimed in claim 1, further comprising a packing member made of a same material as said first member and filled in said working window hole.

7. A metal connector as claimed in claim 1, further comprising a cover plate mounted along an outer face of said first member, adjacent said connecting end portion of said first member, and secured to an upper end face of said core plate of said metal connector body by means of a suitable number of screws.

8. A metal connector for connecting first and second members end to end, comprising:
a metal connector body including a bottom plate and a core plate, said core plate being secured vertically to an upper face of said bottom plate to extend longitudinally along said bottom plate, said core plate having at least one threaded hole formed at each of opposite end faces of said core plate;
each of said first and said second members having a fitting recess formed at connecting end portions thereof, said fitting recesses defining a space suitable to closely receive corresponding longitudinal halves of said bottom plate and said core plate of said metal connector body, said fitting recesses being open to a bottom of said first and said second members;
each of said first and second members being provided with a working window hole formed adjacent said connecting end portion and provided outwardly of said fitting recesses;
each of said first and second members further being provided with a bolt insertion hole for receiving a bolt therein, said bolt insertion hole extending between said fitting recess and said working window hole, said bolt insertion holes and said working window holes being sized sufficiently such that said bolts can be inserted into said bolt insertion holes prior to connecting said first member and said second member to said metal connector body, said blots being displaced horizontally within said bolt insertion holes away from said fitting recesses and toward said working window holes so that said connecting end portion of said first member can be moved vertically downward along said connecting end portion of said second member, or vice versa, and said core plate is received in said fitting recesses without requiring a longitudinal movement of said first member or said second member, whereupon said bolts are connected at one end thereof with said threaded holes formed in said core plate; and
a pair of nuts screwed at opposite end portions of said bolts in the working window holes such that, when said nuts are turned in a predetermined direction to axially move on each bolt toward said metal connector body, said nuts force said first and said second members to move toward each other until the connecting end portions thereof are firmly and securely contacted with each other.

9. A metal connector as claimed in claim 8, wherein said metal connector body is bent in an inverted V-shape at the center thereof in the longitudinal direction of said core plate.

10. A metal connector as claimed in claim 8, further comprising a packing member made of a same material as said first and second members and filled in each of said working window holes.

11. A metal connector as claimed in claim 8, further comprising a cover plate mounted on outer faces of said connecting end portions of said first and second members and secured to an upper end face of said core plate of said metal connector body by means of a suitable number of screws.

12. A jointing structure, comprising:
a metal connector body including a bottom plate and a core plate secured thereto, said core plate having at least one threaded hole formed at an end face thereof;
first and second members to be joined to each other by means of said metal connector body;
means for connecting an end of said metal connector body remote from said at least one threaded hole to said second member;
said first member being provided with a fitting recess formed at a jointing end portion thereof in a profile suitable to closely receive said bottom plate and said core plate of said metal connector body, said fitting recess being open to a bottom of said first member;
said first member further being provided with a working window hole formed adjacent said jointing end portion and outwardly of said fitting recess;
said first member further having a bolt insertion hole extending between said fitting recess and said working window hole for receiving a bolt therein, said bolt insertion hole and said working window hole being sized sufficiently such that said bolt can be inserted into said bolt insertion hole prior to connecting said first member and said metal conductor body, said bolt being displaced within said bolt insertion hole away from said fitting recess and toward said working hole so that said first member can be moved along said second member and said core plate is received in said fitting recess without requiring a longitudinal movement of said first member, whereupon said bolt is connected at one end thereof with said threaded hole formed in said core plate; and
a nut screwed at an opposite end portion of said bolt in said working window hole such that, when said nut is turned to move on said bolt toward said metal connector body, said nut forces said first member to move toward said second member until the jointing end portion of said first member is firmly and securely contacted with said second member.

13. A jointing structure as claimed in claim 12, wherein said connecting means includes a mounting plate secured to said core plate at the end of said metal connector body adjacent said second member, and suitable numbers of fastening bolts and nuts for securing said metal connector body to said second member.

14. A jointing structure as claimed in claim 13, wherein said mounting plate has a plurality of bolt head receiving tubes formed on an outer face thereof for receiving therein the heads of said bolts.

15. A jointing structure as claimed in claim 12, wherein a flange is formed to extend laterally from an upper portion of an outer face of said mounting plate and/or longitudinally from said bottom plate, said second member having a flange receiving recess or recesses formed therein for receiving the flange or flanges therein.

16. A jointing structure as claimed in claim 12, wherein said core plate is cross-shaped, and said second member is a sill, and further comprising suitable numbers of anchor bolts and nuts for securing said bottom plate of said metal connector body to said sill.

17. A jointing structure as claimed in claim 12, further comprising a fitting member made of a same material as said first member and filled in said working window hole.

18. A jointing structure as claimed in claim 12, further comprising a cover plate mounted on an outer face of said jointing end portion of said first member and second to an upper end face of said core plate of said metal connector body by means of a suitable number of screws.

19. A jointing structure as claimed in claim 12, wherein said second member has a fitting recess, a bolt insertion hole and a working window hole formed at a jointing end portion thereof which are similar to said fitting recess, bolt insertion hole and working window hole of said first member, respectively, while said core plate of said metal connector body has a second threaded hole formed at the opposite end face thereof, and said connecting means includes a second bolt and a second nut disposed on said metal connector body in a symmetrical relationship to said bolt and nut, respectively, for jointing said first and second members such that longitudinal ends thereof are closely contacted with each other.

20. A jointing structure as claimed in claim 19, wherein said metal connector body is bent in an inverted V-shape at the center thereof in the longitudinal direction of said core body.

21. A jointing structure as claimed in claim 19, further comprising a cover plate mounted on outer faces of said jointing end portions of said first and second members and secured to an upper end face of said core plate of said metal connector body by means of a suitable number of screws.

* * * * *